United States Patent
Hooda et al.

(10) Patent No.: US 10,541,919 B1
(45) Date of Patent: Jan. 21, 2020

(54) SECURITY ASSOCIATION AND LOCATION MAPPING DECOUPLING IN OVERLAY NETWORKS

(71) Applicant: Cisco Technology, Inc., San Jose, CA (US)

(72) Inventors: Sanjay K. Hooda, Pleasanton, CA (US); Satish K. Kondalam, Milpitas, CA (US); Fabio R. Maino, Palo Alto, CA (US); Victor M. Moreno, Carlsbad, CA (US); Reshad Rahman, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/141,123

(22) Filed: Sep. 25, 2018

(51) Int. Cl.
| | |
|---|---|
| H04L 12/56 | (2006.01) |
| H04L 12/747 | (2013.01) |
| H04L 12/715 | (2013.01) |
| H04L 12/24 | (2006.01) |
| H04L 29/06 | (2006.01) |
| H04L 29/08 | (2006.01) |
| H04L 12/931 | (2013.01) |

(52) U.S. Cl.
CPC ............ *H04L 45/742* (2013.01); *H04L 41/12* (2013.01); *H04L 45/64* (2013.01); *H04L 49/201* (2013.01); *H04L 63/0428* (2013.01); *H04L 63/065* (2013.01); *H04L 67/2842* (2013.01); *H04L 63/20* (2013.01)

(58) Field of Classification Search
CPC ... H04L 45/472; H04L 45/64; H04L 67/2842; H04L 63/065; H04L 63/0428; H04L 49/201; H04L 41/12

USPC ......... 370/389–393, 395.1–395.72, 412–418
See application file for complete search history.

(56) References Cited

U.S. PATENT DOCUMENTS

| | | | |
|---|---|---|---|
| 6,330,562 B1 | 12/2001 | Boden et al. | |
| 9,258,218 B2 | 2/2016 | Hampel et al. | |
| 9,560,018 B2 | 1/2017 | Bellagamba et al. | |
| 10,263,848 B2 * | 4/2019 | Wolting | H04L 41/145 |

(Continued)

OTHER PUBLICATIONS

D. Farinacci, et al., "Locator/ID Separation Protocol (LISP) Data-Plane Confidentiality", Internet Engineering Task Force (IETF), ISSN: 2070-1721, RFC 8061, Feb. 2017, 19 pages.

(Continued)

*Primary Examiner* — Thai D Hoang
(74) *Attorney, Agent, or Firm* — Edell, Shapiro & Finnan, LLC

(57) ABSTRACT

A first map request message is sent from a source network device to a mapping network device to determine a destination network device associated with a destination endpoint device and a security association between the source network device and the destination network device. A first response message is received at the source network device that includes data indicating a mapping between the destination network device and the destination endpoint device and data indicating a security association between the source network device and the destination network device. The data is stored at the source network device. A second map request message is sent from the source network device to the mapping network device to update the data indicative of the mapping or the security association. A second response message is received at the source network device from the mapping network device.

20 Claims, 11 Drawing Sheets

(56) References Cited

U.S. PATENT DOCUMENTS

2016/0057098 A1* 2/2016 Han ............... H04L 61/103
370/390
2017/0026417 A1* 1/2017 Ermagan ............. H04L 12/4641
2017/0054692 A1 2/2017 Weis

OTHER PUBLICATIONS

"IP Routing: LISP Configuration Guide, Cisco IOS XE Release 3S", Jan. 20, 2018, LISP Overview—Cisco, https://www.cisco.com/c/en/us/td/docs/ios/iproute_lisp/configuration/xe-3s/irl-xe-3s-book/irl-overview.html, 7 pages.
V. Moreno, et al., "LISP Virtual Private Networks (VPNs)", draft-ietf-lisp-vpn-01, Network Working Group, Nov. 15, 2017, 16 pgs.
Earls, "Software defined networking security enables granular policy control", Essential Guide, SDN basics for service providers, http://searchsdn.techtarget.com/tip/Software-defined-networking-security-enables-granular-policy-control, downloaded from the Internet Feb. 23, 2018, 3 pgs.
F. Maino, et al., "GPE-VPN: Programmable LISP-based Virtual Private Networks", draft-maino-gpe-vpn-00, LISP Working Group, Mar. 21, 2016, 11 pgs.

\* cited by examiner

SECURITY ASSOCIATION AND LOCATION MAPPING DECOUPLING IN OVERLAY NETWORKS

TECHNICAL FIELD

The present disclosure relates to routing of network traffic in overlay networks.

BACKGROUND

The Locator Identifier Separation Protocol (LISP) provides improved routing scalability and facilitates flexible address assignment for multi-homing, provider independence, mobility, and virtualization. LISP offers an alternative to traditional network architectures by introducing two separate Internet Protocol (IP) addresses: one to indicate routing locators (RLOCs) for routing traffic through the network and a second address for endpoint identifiers (EIDs) used to identify network sessions between devices.

Routers in LISP implementations utilize mapping caches that provide mappings between an EID and the RLOC through which an endpoint accesses the network. LISP implementations may also provide for mapping systems, sometimes implemented on standalone servers or distributed across a plurality of servers, which register and maintain a database of EID and RLOC associations. The mapping system accepts map request messages from routers when a router needs to send traffic to a particular EID but is unaware of the RLOC associated with the EID. The mapping system replies to the map request messages by providing the RLOC associated with an EID identified in the map request message.

DESCRIPTION OF EXAMPLE EMBODIMENTS

Overview

Figure 1:
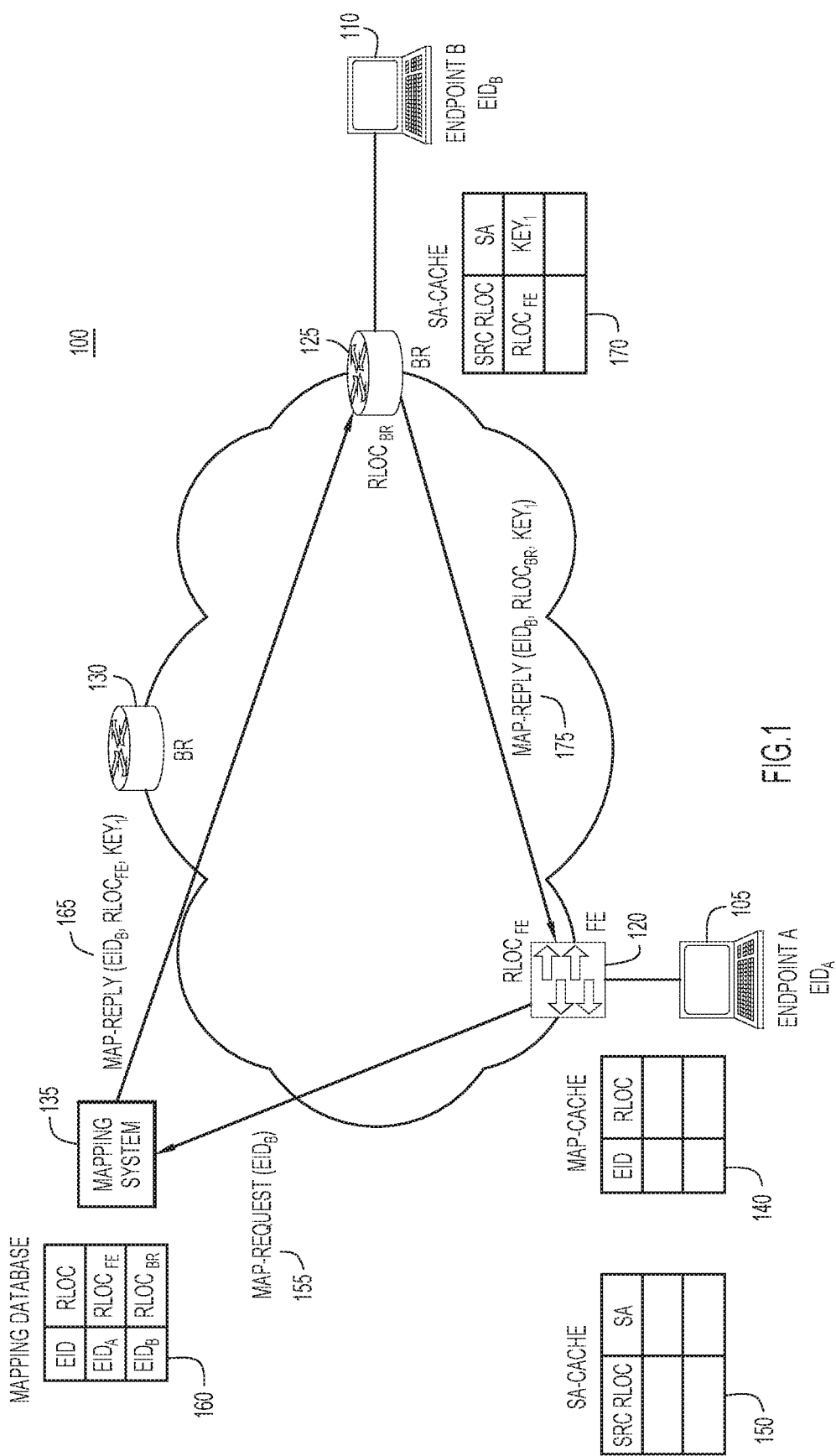
FIG. 1 is an illustration of a first network environment configured to employ the location mapping and security association decoupling techniques as described herein, according to an example embodiment.

Briefly, mechanisms and network implementations are presented herein that provide for security association and location mapping decoupling in overlay networks. In one embodiment, a first map request message is sent via a network from a source network device to a mapping network device to determine a mapping between a destination network device and a destination endpoint device, and to determine a security association between the source network device and the destination network device. A first response message is received at the source network device. The first response message includes data indicative of the mapping between the destination network device and the destination endpoint device, and data indicative of the security association between the source network device and the destination network device. The data indicative of the mapping between the destination network device and the destination endpoint device is stored at the source network device, as is the data indicative of the security association between the source network device and the destination network device. A second map request message is sent from the source network device to update the stored data indicative of the mapping between the destination network device and the destination endpoint device or the stored data indicative of the security association between the source network device and the destination network device. A second response message in response to the second map request message is received at the source network device. One of the stored data indicative of the mapping between the destination network device and the destination endpoint device or the stored data indicative of the security association between the source network device and the destination network device is updated independently from another of the stored data indicative of the mapping between the destination network device and the destination endpoint device or the stored data indicative of the security association between the source network device and the destination network device.

According to another embodiment, a first map request message is sent via a network from a source network device to a mapping network device to determine a mapping between a destination network device and a destination endpoint device, and to determine a security association between the source network device and the destination network device. A first response message is received at the source network device. The first response message includes data indicative of the mapping between the destination network device and the destination endpoint device and data indicative of the security association between the source network device and the destination network device. Data indicative of the mapping between the destination network device and the destination endpoint device is stored at the source network device, as is data indicative of the security association between the source network device and the destination network device. The data indicative of the mapping between the destination network device and destination endpoint device is updated after a first duration. The data indicative of the security association between the source network device and the destination network device is updated after a second duration different than the first duration.

Example Embodiments

With reference now made to FIG. 1, depicted therein is a network environment 100 in which endpoints 105 and 110 are configured to access network 100 via routers 120, 125 and 130. Each of routers 120, 125 and 130 may serve as border routers for network 100. Similarly, routers 120, 125 and 130 may serve as tunnel routers, either egress or ingress tunnel routers, for packets sent through network 100. Network 100 may be embodied as a campus fabric network that implements a logical or virtual overlay network. A logical or virtual overlay network is a network in which a logical structure is applied to an underlying physical network infrastructure. For example, network 100 may be a Software Defined Network (SDN) that provides Software Defined Access (SDA). SDA networks leverage virtual network overlays in order to support mobility, segmentation and programmability at very large scale.

Within network 100, one or more of endpoints 105 and 110 may be mobile, and therefore, endpoints 105 and 110 may move between routers 120, 125 and 130. Due to this mobility, network 100 includes mapping system 135. Mapping system 135 provides mappings between endpoints and the routers through which the endpoints access network 100. When endpoint 105 sends traffic to endpoint 110, endpoint 105 addresses a packet to endpoint 110 and transmits it to router 120. Router 120 includes a map cache 140 populated via mapping system 135. Map cache 140 stores a mapping between the routers 120, 125 and 130 and the endpoints attached to the routers. Accordingly, when router 120 receives the packet from endpoint 105 addressed to endpoint 110, router 120 will utilize map cache 140 to determine where to send the packet.

According to specific example embodiments, routers 120, 125 and 130, may implement the Locator Identifier Separation Protocol (LISP). In such embodiments, network devices (i.e., devices that provide for the routing system within network 100) are provided with routing locators (RLOCs). Endpoint devices (i.e., devices that utilize the network but that are not part of the network infrastructure) are assigned endpoint identifiers (EIDs). While both of RLOCs and EIDs may use the same type of identifier, such as an Internet Protocol (IP) address associated with the respective devices, the functions for which EIDs and RLOCs are used are different. In LISP, RLOCs are used for routing traffic through the network (i.e., network 100) and EIDs used to identify network sessions between devices. In other words, when traffic is sent through network 100, RLOCs are used to route the traffic to the appropriate router through which the endpoints access network 100, and the EIDs are used by the routers to deliver the traffic to the appropriate endpoint. Therefore, in example embodiments of network 100 in which LISP is implemented, map cache 140 stores mappings between RLOCs and EIDs so that router 120 may utilize map cache 140 to determine which RLOC to use to forward the traffic to so that the traffic arrives at the router that services the appropriate endpoint.

When using map cache 140, router 120 determines if map cache 140 contains an entry associated with the address (e.g., EID)) for endpoint 110 indicated in the packet sent by endpoint 105. If such an entry exists, router 120 encapsulates the packet with encapsulation of a destination address (e.g., RLOC) of the router through which endpoint 110 accesses network 100. In the example of FIG. 1, that router would be router 125. Network 100 is also configured to provide encryption for traffic sent between routers 120, 125 and 130. To facilitate this encryption, security association cache 150 is provided to store data indicative of encryption keys associated with routers, and these keys are used when sending traffic through network 100. As will be described below, the process illustrated in FIG. 1 generates pairwise unidirectional keys between the router serving as the access point for endpoint 105 (i.e., a source network device or source network router) and the router serving as the access point for the destination endpoint 110 (i.e., a destination network device or destination router). Accordingly, if either of routers 120 or 125 is compromised, the attacker only gains visibility on the traffic that goes through that router.

If map cache 140 lacks an entry associated with endpoint 110, mapping system 135 may be used to determine the router through which endpoint 110 accesses network 100. Accordingly, map request message 155 is sent to mapping system 135. Map request message 155 is configured to populate both map cache 140 and security association cache 150. Because both map cache 140 and security association cache 150 are empty, map request message 155 is configured to populate both caches with data necessary to transmit traffic through network 100 between endpoint 105 and endpoint 110. Accordingly, map request message 155 is augmented with metadata used to establish a security association between router 120 and whichever router is identified by mapping system 135 as being associated with endpoint 110.

As illustrated in FIG. 1, mapping system 135 maintains a mapping database 160 that contains/stores a mapping between endpoints and the routers through which the endpoints access network 100. In LISP embodiments, these mappings represent mappings between EIDs and RLOCs. Mapping system 135 may be configured to respond directly to mapping requests by sending the appropriate mapping for endpoint 110 directly to router 120. A different approach is taken in the example embodiment illustrated in FIG. 1 because there are no security association entries in security association cache 150, and therefore, router 120 may be configured to determine a security association for traffic between endpoint 105 and 110 at the time it establishes the mapping for endpoint 110.

In order to populate security association cache 150 as well as mapping cache 140 and in response to message 155, mapping system 135 sends a message 165 to the router through which endpoint 110 connects to network 100, in this case, router 125. Message 165 contains data indicative of endpoint 110, indicative of router 120 (i.e., the router that requests the mapping), and indicative of the key that will be used to encrypt traffic between router 120 and 125. Based upon message 165, router 125 will update its security association cache 170 to include data indicative of the encryption key and router 120. This data in security association cache 170 will permit router 125 to decrypt traffic received from router 120 and also encrypt traffic sent to router 120. According to other example embodiments, mapping system 135 will forward message 155 to router 125 as message 165. Because message 155 was augmented with metadata used to establish a security association between router 120 and router 125, message 165 includes data used to establish the security association between router 120 and router 125.

Router 125 also sends message 175 to router 120. Contained within message 175 is data that enables router 120 to populate both of mapping cache 140 and security association cache 150. In embodiments in which mapping system 135 provided the necessary security association to router 125 via message 165, message 175 includes data indicative of router 125 as the router through which endpoint 110 connects to network 100 as well as data indicative of the key provided by mapping system 135 that will enable routers 120 and 125 to encrypt and decrypt traffic sent between the two routers. In example embodiments in which mapping system 135 forwards message 155 to router 125 as message 165, message 175 initiates an exchange between router 125 and router 120 that permits the network devices to establish the security association therebetween. With the security association established, security association cache 150 may be populated with data indicative of the key that will enable routers 120 and 125 to encrypt and decrypt traffic sent between the two routers.

With mapping cache 140 and security association cache 150 populated, router 120 is enabled to send traffic through network 100 to endpoint 110. Accordingly, an example of such traffic transmission is illustrated in FIG. 2.

Figure 2:
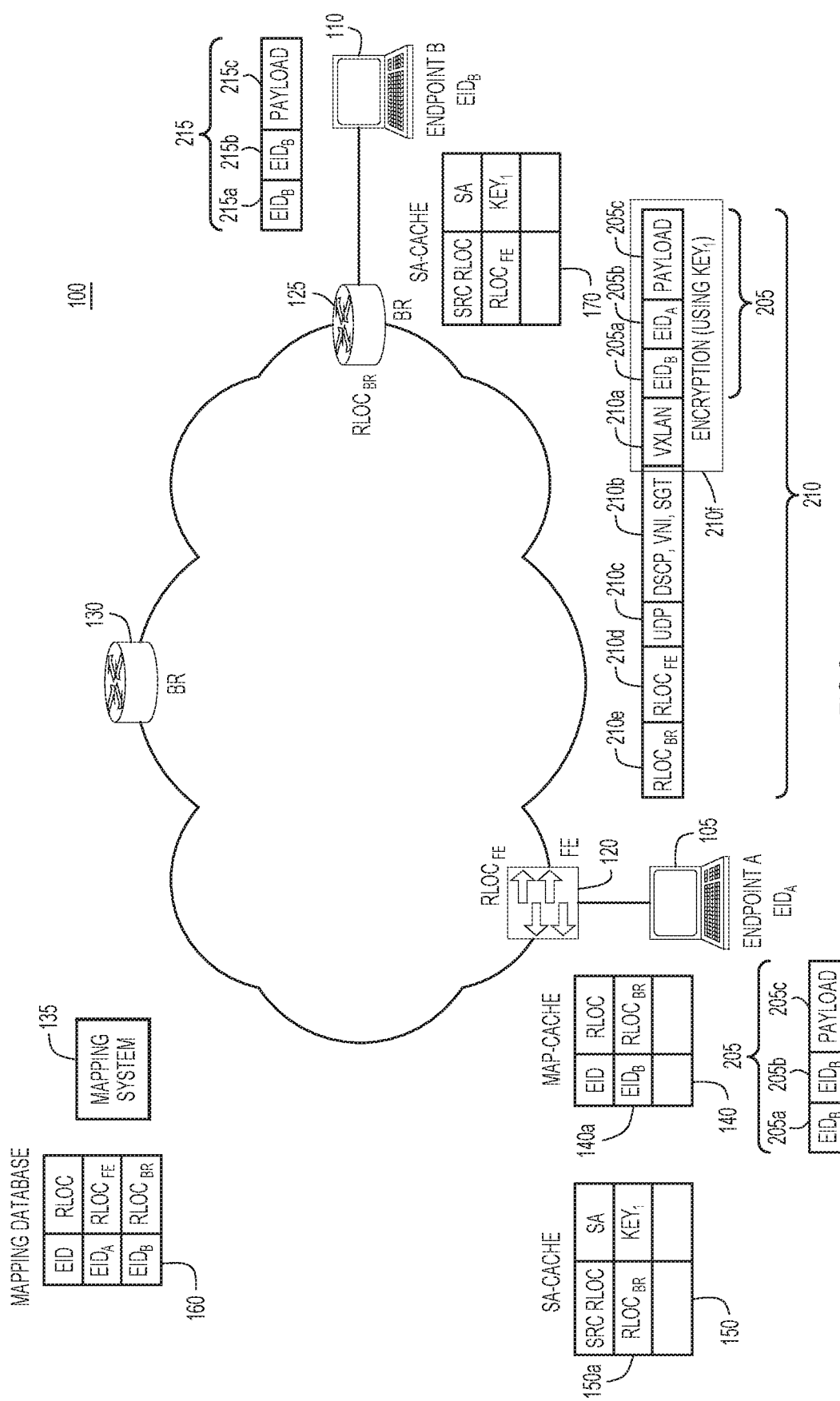
FIG. 2 is an illustration of the network environment further illustrating the transmission of traffic through the network as enabled by the location mapping and security association decoupling techniques as described herein, according to an example embodiment.

With reference made to FIG. 2, endpoint 105 generates packet 205 for transmission to endpoint 110. Packet 205 includes a destination address 205a indicative of endpoint 110, a source address 205b indicative of endpoint 105, and a payload 205c. Based upon packet 205, router 120 generates packet 210 based upon the contents of mapping cache 140. Packet 210 encapsulates the content of packet 205 with a Virtual Extensible Local Area Network (VXLAN) header 210a; a Differentiated Services Code Point (DSCP) identifier, a VXLAN network identifier (VNI), and a Security Group Tag (SGT) in portion 210b; a User Datagram Protocol (UDP) header 210c, a source address 210d indicating router 120; and a destination address 210e indicating router 125. Encryption 210f is applied to the VXLAN header 210a and to the contents of packet 205 using the contents of security association cache 150. Packet 210 is then transmitted through network 100.

Upon receipt at router 125, encryption 210f may be decrypted according to the contents of security association cache 170, and the encapsulation applied by router 120 is stripped by router 125. The underlying packet is then forwarded to endpoint 110 as packet 215, essentially recreating packet 205 initially sent by endpoint 105 to router 120. Accordingly, the process illustrated in FIG. 1 enables router 120 to populate map cache 140 and security association cache 150, and transmit traffic between endpoints through network 100, as illustrated in FIG. 2.

According to the techniques described herein, the updating or refreshing of map cache 140 and security association caches 150 and 170 may take place through different processes. For example, if one endpoint 110 is embodied as a mobile device, such as a laptop computer, a smartphone, or a tablet computer, the mapping between the endpoint 110 and the router through which it accesses network 100 may be updated very frequently, such as on an order of seconds or minutes. On the other hand, encryption keys may not be updated with such frequency. Furthermore, multiple endpoints may access network 100 through the same router. By providing separate caches for the mappings and security associations, and updating the caches on different schedules, the security associations may be utilized for multiple endpoints. Illustrated in FIG. 3 is a process for updating map cache 140 independently from security association cache 150.

Figure 3:
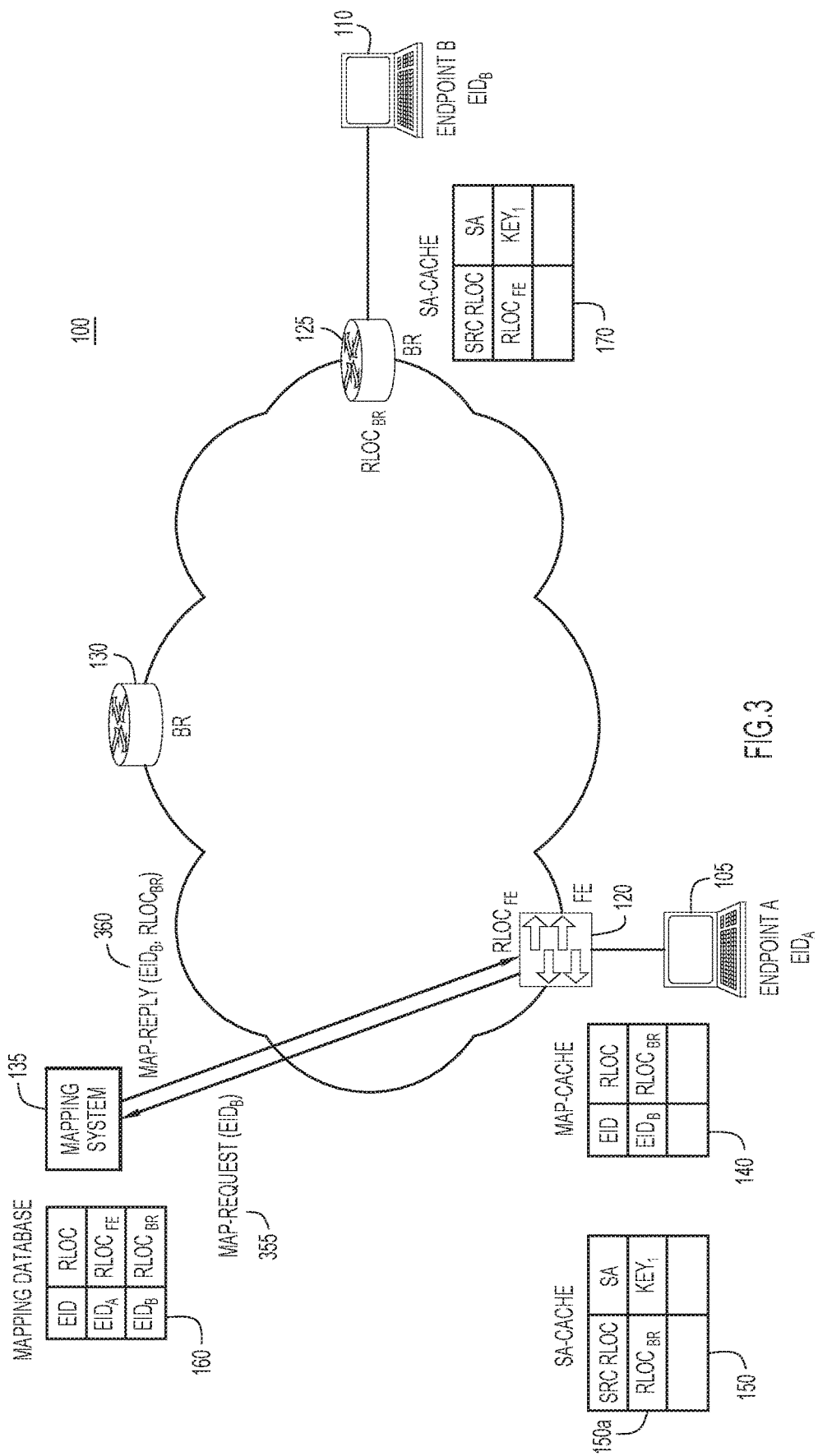
FIG. 3 is an illustration of the network environment depicting a process for updating map cache values independently from security association cache values through the location mapping and security association decoupling techniques as described herein, according to an example embodiment.

As illustrated in FIG. 3, both map cache 140 and security association cache 150 contain entries. Accordingly, unlike the process in FIG. 1, it may be the case that router 120 already contains a security association between router 120 and the router through which endpoint 110 connects to network 100. Therefore, router 120 sends map request message 355 that is configured to cause mapping system 135 to respond directly to router 120 with map reply message 360. If map reply message 360 indicates that endpoint 110 accesses network 100 via router 125, then no further action is required because security association cache 150 contains entry 150a that provides the key necessary to encrypt traffic between router 120 and router 125. As illustrated in FIG. 3, endpoint 110 accesses network 100 via router 125, and this mapping is indicated in map reply message 360. Traffic sent from endpoint 105 to endpoint 110 may then be transmitting through network 100 according to the process illustrated in FIG. 2.

Figure 4:
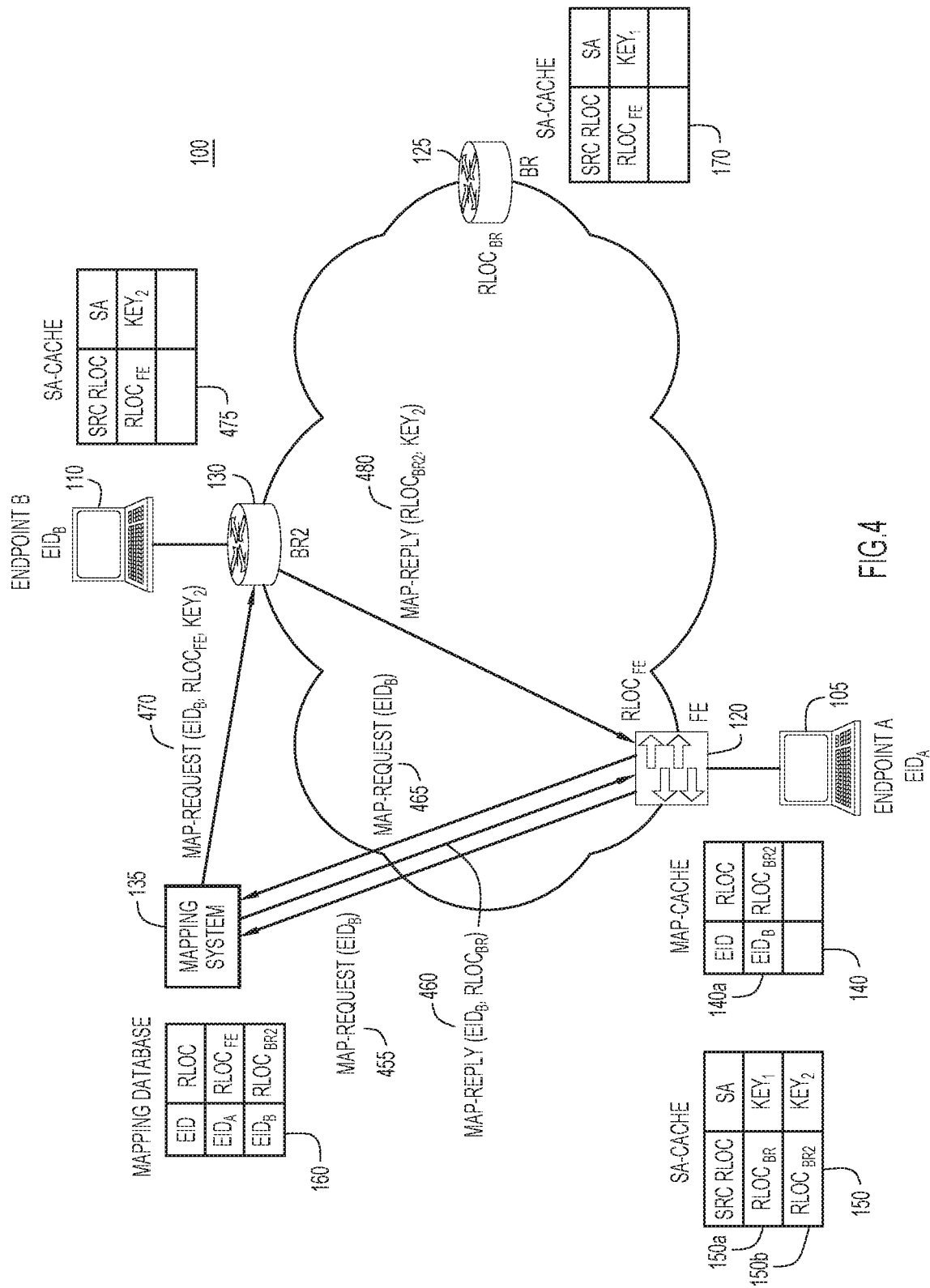
FIG. 4 is an illustration of the network environment further depicting a process for updating map cache values and security association values through the location mapping and security association decoupling techniques as described herein, according to an example embodiment.

With reference now made to FIG. 4, illustrated therein is an alternative to the process illustrated in FIG. 3, in which endpoint 110 no longer connects to network 100 via router 125, and instead connects to network 100 via router 130. Similar to the process of FIG. 3, router 120 sends map request message 455 that is configured to cause mapping system 135 to respond directly to router 120 with map reply message 460. If map reply message 460 indicates that endpoint 110 accesses network 100 via router 125, then no further action is required because security association cache 150 contains entry 150a that provides the key necessary to encrypt traffic between router 120 and router 125. As illustrated in FIG. 4, endpoint 110 no longer accesses network 100 via endpoint 130 but instead accesses network 100 via router 130. Based upon map reply message 460, router 120 will update map cache 140 to indicate the mapping between endpoint 110 and router 130. As illustrated in FIG. 4, entry 140a will be updated to reflect data as illustrated in entry 140a. This new mapping is indicated in map reply message 460. Because entry 150a is the only entry in security association cache 150, and it indicates a security association for router 125, not router 130, router 120 initiates a process to establish a security association between router 120 and router 130.

While map cache 140 has been updated to reflect router 130 as the access point for endpoint 110, security association cache 150 lacks an entry for router 130. Therefore, router 120 not return any value when it accesses security association cache 150 in order to determine an encryption key for encryption of traffic destined for endpoint 110. In response to not finding a security association for router 130, router 120 sends map request message 465 to mapping system 135. Map request message 465 is augmented with metadata used to establish a security association between router 120 and router 130, the router through which endpoint 110 now accesses network 100. In response to map request message 465, mapping system 135 sends message 470 to the router through which endpoint 110 connects to network 100, in this case, router 130. Message 470 contains data indicative of endpoint 110, indicative of router 120 (i.e., the router that requests the mapping), and indicative of the key that will be used to encrypt traffic between router 120 and 130.

Based upon message 470, router 130 will update its security association cache 475 to include data indicative of the encryption key and router 120. This data in security association cache 475 will permit router 125 to decrypt traffic received from router 120 and also encrypt traffic sent to router 120. Router 130 also sends message 480 to router 120. Contained within message 480 is data that enables router 120 to populate security association cache 150 with the security association for router 130, as illustrated in entry 150*b*. Specifically, message 480 includes data indicative of the key provided by mapping system 135 that will enable routers 120 and 130 to encrypt and decrypt traffic sent between the two routers. With security association cache 150 populated to include entry 150*b*, router 120 is enabled to send encrypted traffic through network 100 to endpoint 110.

A process like that illustrated in FIG. 4 may also be utilized to provide the initial mapping for endpoint 110 to router 120. For example, in response to receiving traffic addressed to endpoint 110 from endpoint 105, and not finding an entry associated with endpoint 110 in map cache 140, router 120 will send map request message 455 that is configured to cause mapping system 135 to respond directly to router 120 with map reply message 460. As illustrated in FIG. 4, endpoint 110 accesses network 100 via router 130. Based upon map reply message 460, router 120 will update map cache 140 to indicate the mapping between endpoint 110 and router 130. If there is no security association in security association cache 150 associated with endpoint 130, router 120 initiates a process to establish a security association between router 120 and router 130. Router 120 sends map request message 465 to mapping system 135. Map request message 465 is augmented with metadata used to establish a security association between router 120 and router 130, the router through which endpoint 110 accesses network 130. In response to map request message 465, mapping system 135 sends message 470 to the router through which endpoint 110 connects to network 100, in this case, router 130. Message 470 contains data indicative of endpoint 110, indicative of router 120 (i.e., the router that requests the mapping), and indicative of the key that will be used to encrypt traffic between router 120 and 130. The process will then follow that described above so that both router 120 and 130 may update their respective security association caches 140 and 475 to permit the transmission of encrypted traffic between endpoint 105 and endpoint 110.

Figure 5:
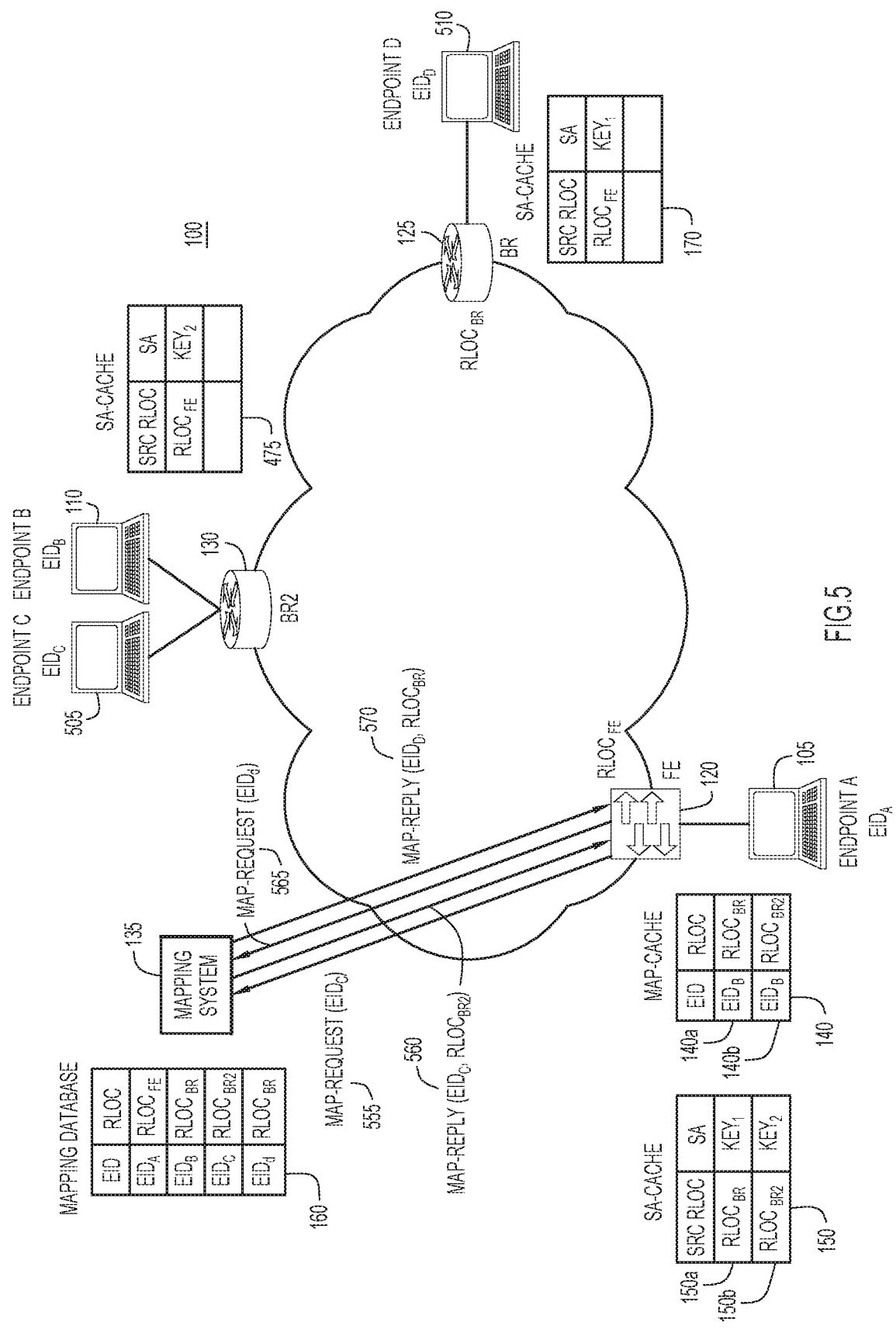
FIG. 5 is an illustration of the network environment depicting a second process for updating map cache values independently from security association cache values through the location mapping and security association decoupling techniques as described herein, according to an example embodiment.

With reference made to FIG. 5, depicted therein is network 100 at some point in time subsequent to that shown in FIG. 4. As shown in FIG. 5, two additional endpoints 505 and 510 now access network 100. Endpoint 505 accesses network 100 through router 130, while endpoint 510 accesses network 100 through router 125. Security association cache 150 includes a security association for router 125 in entry 150*a*, populated according to the process as illustrated in FIG. 1, and includes a security association for router 130 in entry 150*b*, populated according to the process as illustrated in FIG. 1. Therefore, when traffic is sent from endpoint 105 to either of endpoints 505 or 510, there is no need to establish security association for the routers through which these endpoints access network 100. Specifically, when endpoint 105 sends traffic to endpoint 505, router 120 will send map request message 555 to mapping system 135. Mapping system 135 replies with map reply message 560 that indicates the mapping between endpoint 505 and router 130. When router 120 accesses security association cache 150 to retrieve the security association for traffic sent between router 120 and 130, entry 150*b* will be returned. Accordingly, router 120 will be able to encrypt and transmit traffic through network 100 to router 130 without reestablishing a new security association between router 120 and router 130. Instead, router 120 may reuse the security association previously established in the process illustrated in FIG. 4 that initially populated entry 150*b*.

Similarly, when endpoint 105 sends traffic to endpoint 510, router 120 will send map request message 565 to mapping system 135. Mapping system 135 replies with map reply message 570 that indicates the mapping between endpoint 510 and router 125. When router 120 accesses security association cache 150 to retrieve the security association for traffic sent between router 120 and 125, entry 150*a* will be returned. Accordingly, router 120 will be able to encrypt and transmit traffic through network 100 to router 125 without reestablishing a security association between router 120 and router 125. Instead, router 120 may reuse the security association previously established in the process illustrated in FIG. 1 that initially populated entry 150*a*.

Figure 6:
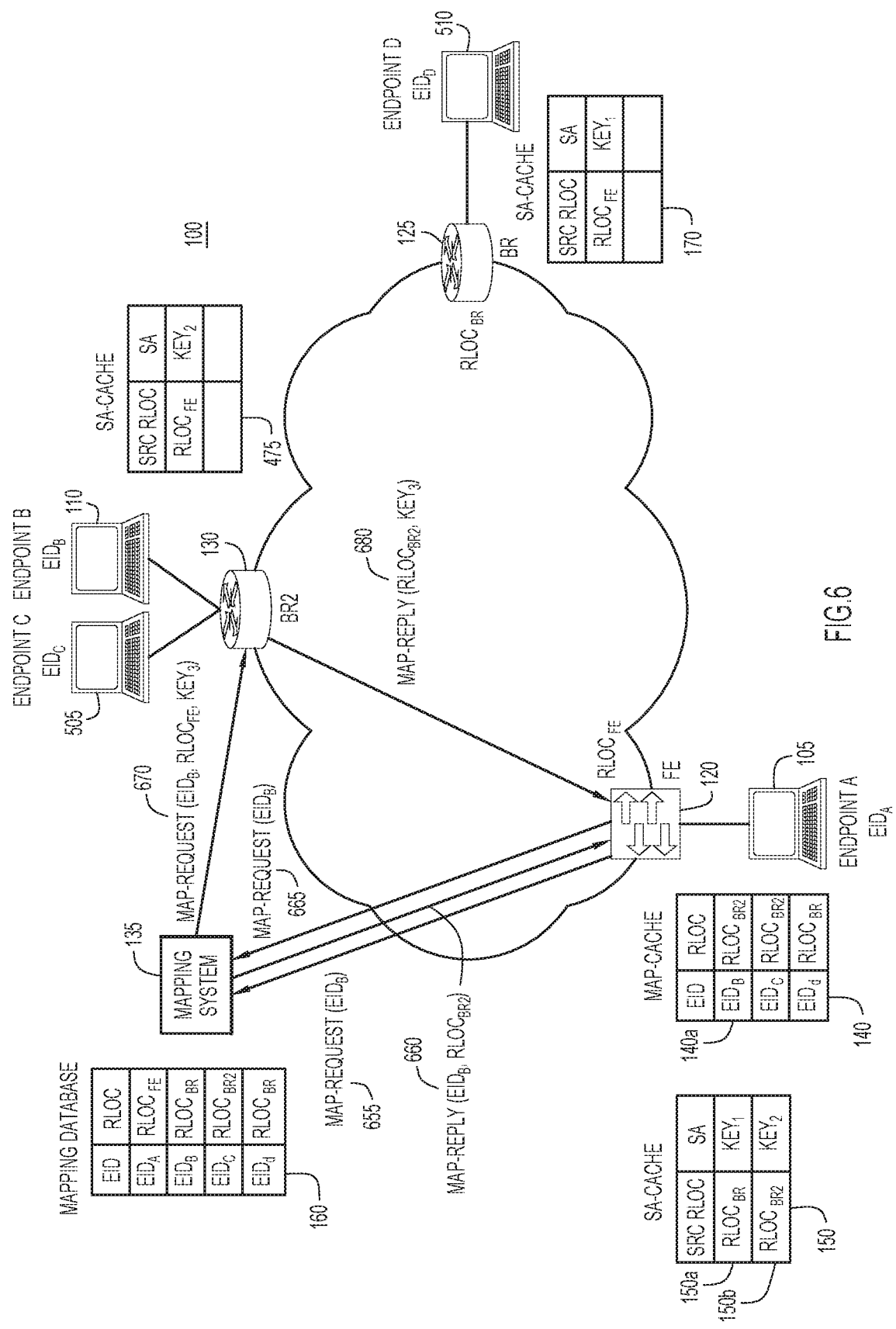
FIG. 6 is an illustration of the network environment depicting a process for updating security association cache values through the location mapping and security association decoupling techniques as described herein, according to an example embodiment.

With reference now made to FIG. 6, depicted therein are processes via which map cache 140 and security association cache 150 may be independently refreshed or updated, independently from traffic sent between endpoints 105, 110, 505 and 510, and after different intervals of time for the respective caches. For example, router 120 may be configured to refresh or delete entries 140*a* and 140*b* of map cache after a predetermined duration or period of time. For example, if entry 140*a* has been present in map cache 140 for a certain duration, router 120 may update the entry or delete the entry depending on how recently traffic has been sent from router 120 to the endpoint associated with the entry. To update entry 140*a*, router 120 will send map request message 655 to mapping system 135, and mapping system 135 will reply with map reply message 660 providing an updated mapping for endpoint 110. Router 120 may then access security association cache 150 to ensure that there is a security association for the router indicated in map reply message 660. If the there is no security association in security association cache 150 corresponding to the endpoint indicated in map reply message 660, router 120 may initiate a process like that illustrated in FIGS. 1 and/or 4 to determine a mapping association for the router indicated in map reply message 660.

Router 120 may also independently clear or refresh the entries in the security association cache 150. For example, after a predetermined duration or period of time, router 120 may determine that one or more entries in security association cache 150 has not been used for traffic sent through network 100. Any entry that goes unused for a certain duration or period of time may be cleared from the cache. According to other examples, entries in security association cache 150 may be updated to ensure that the keys used for the encryption are not compromised. Accordingly, even if such entries have been recently used, router 120 may refresh the key associated with the entry to ensure that the key is not compromised. To update the security association for entry 150*b*, router 120 will send map request message 665 to mapping system 135. Map request message 665 is augmented with metadata used to establish a security association between router 120 and router 130. In response to map request message 665, mapping system 135 sends message 670 to the router through which endpoint 110 connects to network 100, in this case, router 130. Message 670 contains data indicative of endpoint 110, indicative of router 120 (i.e., the router that requests the mapping), and indicative of a new key that will be used to encrypt traffic between router 120 and 130 and that will replace the previously used key.

Based upon message 670, router 130 will update its security association cache 475 to include data indicative of the new encryption key for router 120. Router 130 also sends message 680 to router 120. Contained within message 680 is data that enables router 120 to refresh security association cache 150 entry 150b with the new key for router 130.

Figure 7:
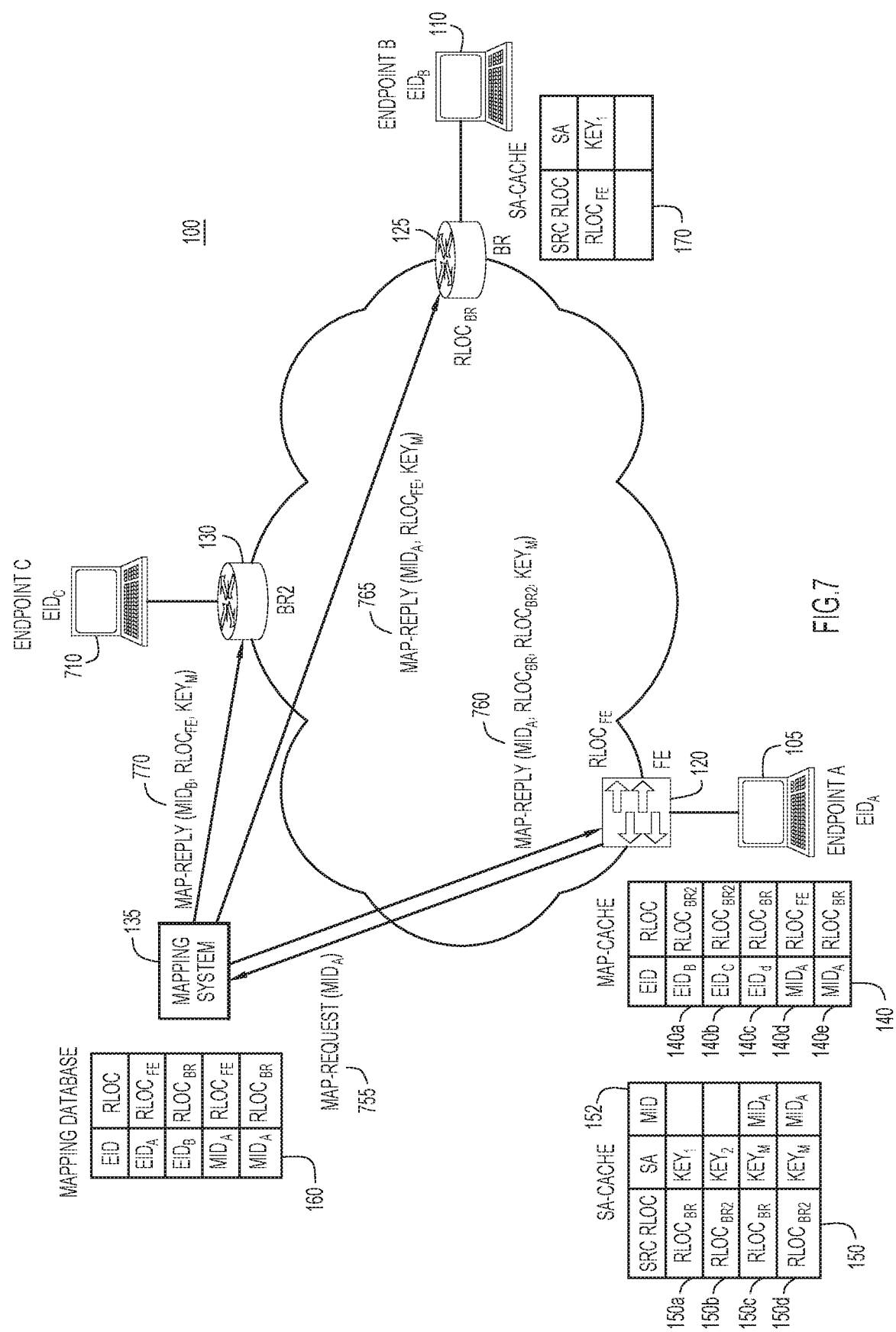
FIG. 7 is an illustration of the network environment implementing the location mapping and security association decoupling techniques as described herein for multicast traffic, according to an example embodiment.

With reference now made to FIG. 7, depicted therein is network 100 in which router 120 and mapping system 135 implement a process to distribute keys for multicast addressed traffic sent from endpoint 105 via router 120 and destined for both of endpoints 110 and 710. The process as illustrated in FIG. 7 is, according to example embodiments, not a group key negotiation mechanism. Instead, the security association (i.e., the key used to encrypt traffic) meant for a given multicast group is shared with all the routers that are members of that multicast group. However, the key is used only to encrypt the multicast traffic sent to that multicast group, and it is not used to encrypt unicast traffic. An attacker that compromises a key for a given multicast group, will be able to decrypt only the multicast traffic that is sent to that specific group, but not any other traffic sent to the other members of the multicast group, including multicast traffic that belongs to other multicast groups that do not use the compromised key.

The process illustrated in FIG. 7 begins when endpoint 105 generates a packet addressed to a multicast address. According to the example of FIG. 7, the multicast address indicates a multicast group that includes endpoint 110 and endpoint 710. Upon receipt of the multicast-addressed packet, router 120 accesses both map cache 140 and security association cache 150 to determine if they contain a mapping and/or key for transmission of traffic utilizing the indicated multicast address. If either cache lacks the appropriate entry, router 120 sends map request message 755 to mapping system 135. Map request message 755 is augmented with metadata used to establish a security association between router 120 and whichever router is identified by mapping system 135 as being associated with the indicated multicast address. Upon receipt of message 760, mapping system 135 establishes the security association for the multicast address and sends map reply messages 760, 765 and 770. Map reply message 760 provides the appropriate mapping between the multicast address and routers 125 and 130, as well as the key used to encrypt the traffic sent to the multicast address. The data contained in map reply message 760 allows router 120 to populate entries 150c and 150d of security associate cache 150 and entries 140d and 140e of map cache 140. As illustrated in security association cache 150, when used with multicast traffic, map cache 150 may include additional information, such as multicast address identifier 152. Because the key associated with the multicast address is the key used only to encrypt the multicast traffic sent to that multicast group, the multicast identifier 152 is used to distinguish between entry 150a, which includes the key for unicast traffic to router 125, and entry 150c, which is used for a particular multicast group that includes router 125. Similarly, multicast identifier 152 is used to distinguish between entry 150b, which includes the key for unicast traffic to router 130, and entry 150d, which is used for a particular multicast group that includes router 130.

Map reply messages 765 and 770 provide endpoints 125 and 130 with the mapping between the multicast address and router 120 and the key used to encrypt traffic sent according to the multicast address.

Figure 8:
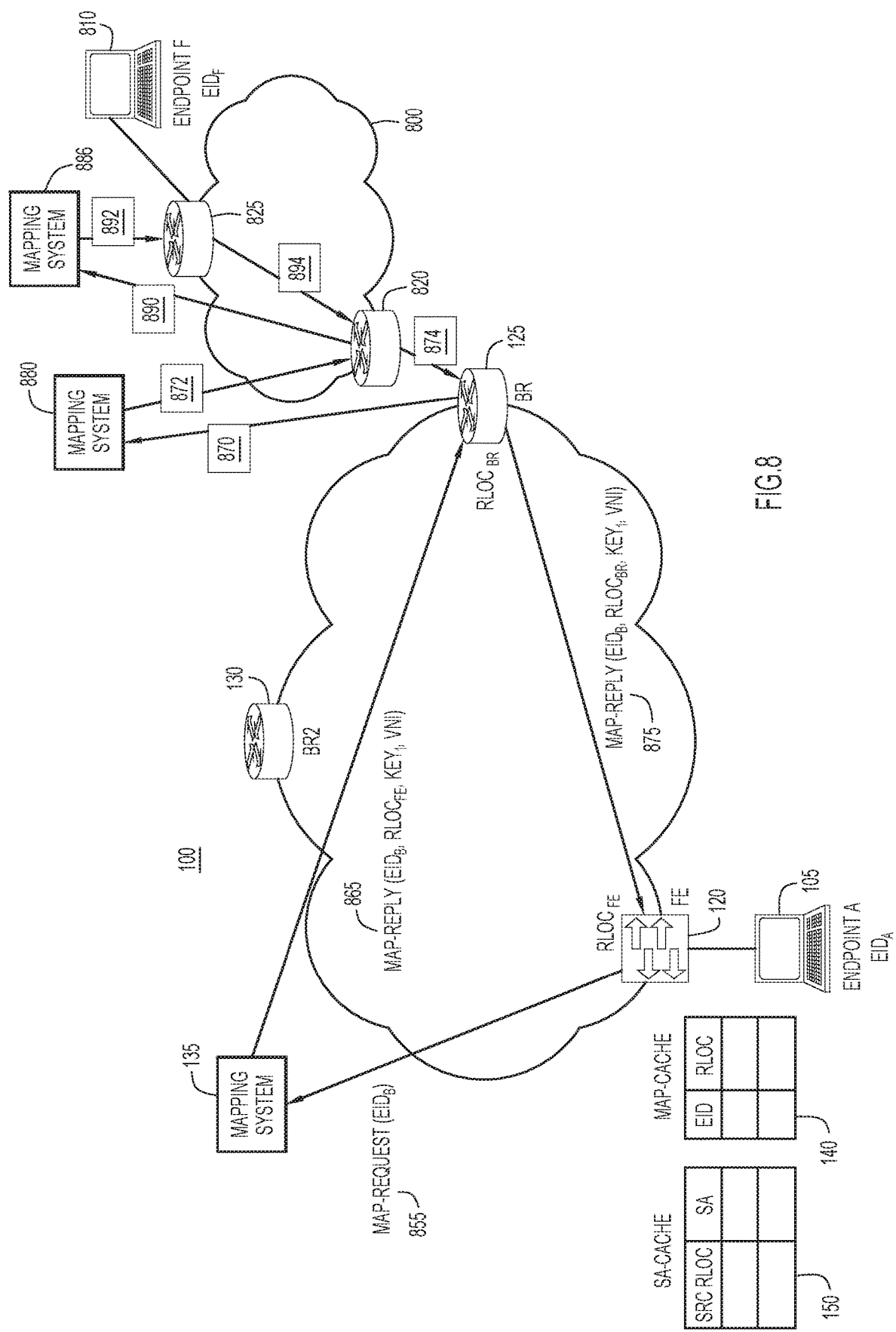
FIG. 8 is an illustration of the network environment implementing the location mapping and security association decoupling techniques as described herein across multiple network domains, according to an example embodiment.

With reference now made to FIG. 8, depicted therein is an example embodiment in which the techniques described herein are applied to network environments that send traffic across multiple domains or virtual network instances. As illustrated in FIG. 8, there are two SDN networks, network 100 and network 800. For example, network 100 and network 800 may be implemented through separate VXLANs, and therefore, are identified using separate VNIs. Each of networks 100 and 800 has its own mapping system, mapping systems 135 and 886, respectively, which provide mappings between routers within each network. Also illustrated in FIG. 8 is mapping system 880. Mapping system 880 provides mapping for border routers between separate network instances. Specifically, mapping system 880 provides a mapping between border router 125 and network 100 and also between border router 820 and network 800. Mapping system 880 enables mappings to be determined that permit traffic to be sent between endpoints in different network instances. As will be described with reference to FIG. 8, mapping system 880 enables traffic to be transmitted from endpoint 105 in network 100 to endpoint 810 in network 800.

According to the example of FIG. 8, router 120 receives traffic addressed to endpoint 810 from endpoint 105. The process illustrated in FIG. 8 begins in a manner similar to that of FIGS. 1, 3 and 4. In response to receiving traffic from endpoint 105, router 120 accesses map cache 140 to determine if there is a mapping for endpoint 810 in map cache 140. In response to not finding an entry associated with endpoint 810 in map cache 140, router 120 will send map request message 855 to mapping system 135. Mapping system 135 determines that endpoint 810 is arranged outside of network 100 in network 800. Mapping system 135 also determines that router 125 connects network 100 to network 800. In response to this determination, mapping system sends message 865 to router 125, in which mapping system 135 has included the VNI for network 800.

Based upon message 865, router 125 may send message 875 to router 120. Message 875 enables a security association to be established between router 120 and router 125 and enables router 120 to populate map cache 140 and security association cache 150, thereby enabling router 120 to send the traffic generated by endpoint 105 as encrypted traffic within network 100 to router 125.

In addition to message 865, router 125 also sends message 870 to mapping system 880. The transmission of message 870 will result in message 872 being sent from mapping system 880 to router 820, and message 874 being sent to router 125. These messages establish a security association between router 125 and router 820, as well as population of mapping and security association caches at router 125 through a process analogous to that the described herein with reference to messages 855, 865 and 875. Similarly, router 820 may send message 890 to mapping system 880. The transmission of message 890 will result in message 892 being sent from mapping system 886 to router 825, and message 894 being sent to router 820. These messages establish a security association between router 820 and router 825, as well as population of mapping and security association caches at router 820 through a process analogous to that the described herein with reference to messages 855, 865 and 875. With the mappings and security associations established between routers 120 and 125, routers 125 and 820, and 820 and 825, traffic may be sent from endpoint 105 to endpoint 810. Furthermore, the transmission of this traffic may be sent using different encryption keys for transmission within network 100, between networks 100 and 800, and in network 800, respectively. Furthermore, each of these mappings and security associations may be updated using processes as described above with reference to FIGS. 1-7.

Figure 9:
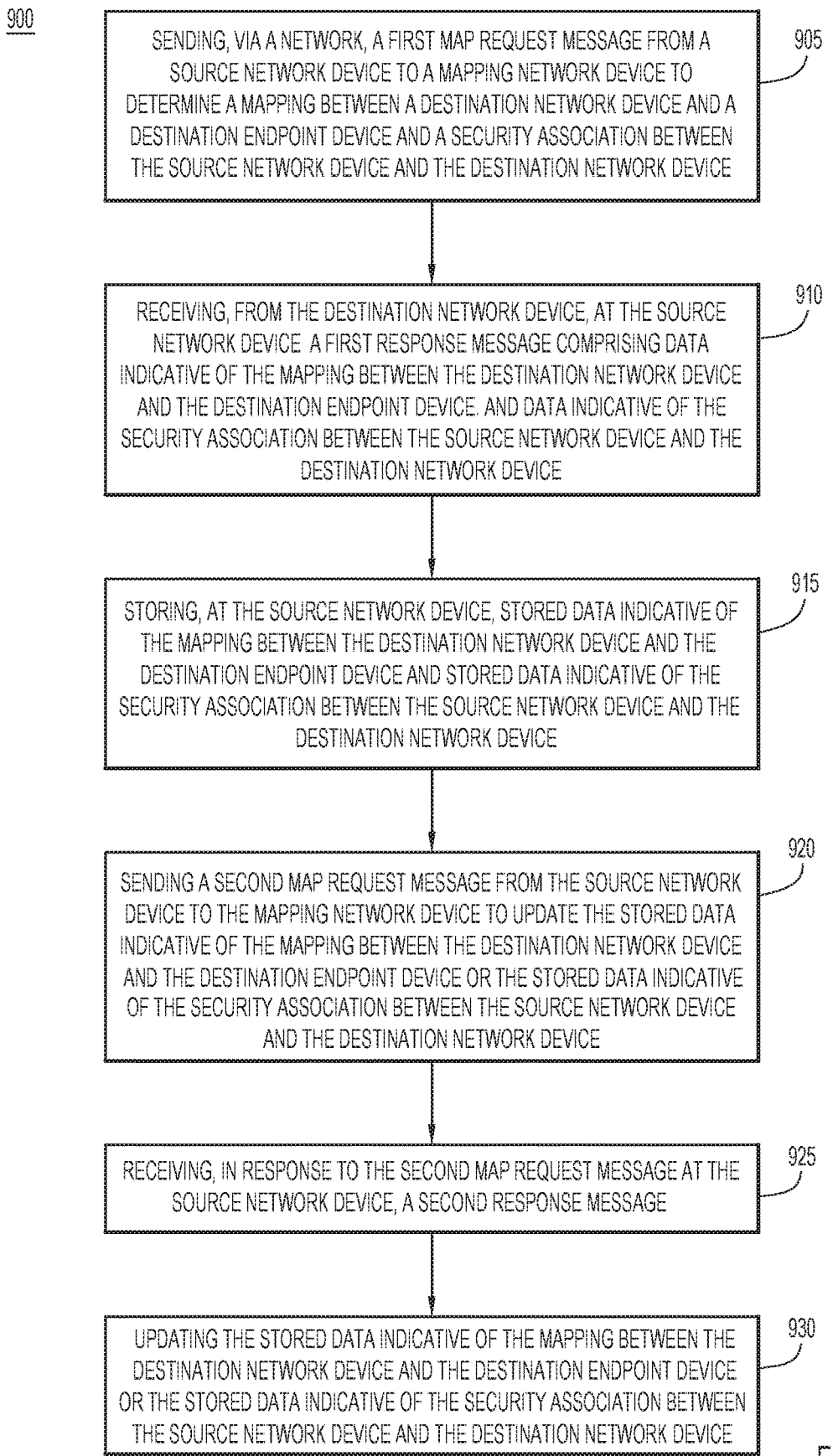
FIG. 9 is a flowchart illustrating a first process flow for implementing the location mapping and security association decoupling techniques as described herein, according to an example embodiment.

With reference now made to FIG. 9, depicted therein is a flowchart 900 illustrating a first example process for providing the location mapping and security association decoupling techniques as described herein. The process starts in operation 905 in which a first map request message is sent via a network from a source network device to a mapping network device to determine a mapping between a destination network device and a destination endpoint device, and a security association between the source network device and the destination network device. An example of such an operation may be the sending of one or more of message 155 in FIG. 1, message 355 in FIG. 3, message 455 in FIG. 4, message 555 in FIG. 5, message 755 in FIG. 7 and/or message 855 in FIG. 8. Additional examples include messages 870 and 890 as discussed above with reference to FIG. 8.

In operation 910, a first response message is received at the source network device from the destination network device. The first response message includes data indicative of a mapping between the destination network device and the destination endpoint device, and data indicative of a security association between the source network device and the destination network device. Examples of such a message include the messages received at router 120 as discussed above with reference to FIGS. 1 and 3-8 that enable router 125 to populate its map cache and security association cache. Further examples may include messages 874 and 892 as discussed above with reference to FIG. 8.

In operation 915 data indicative of the mapping between the destination network device and the destination endpoint device and the data indicative of the security association between the source network device and the destination are stored at the source network device. Examples of operation 915 may include the population of map caches and security association caches as described above with reference to FIGS. 1-8.

In operation 920, a second map request message is sent from the source network device to the mapping network device to update the stored data indicative of the mapping between the destination network device and the destination endpoint device or the stored data indicative of the security association between the source network device and the destination network device. Examples of operation 920 include the sending of message 455 or message 655, described above reference to FIGS. 4 and 6, respectively. Other examples of operation 920 include the sending of message 355, described above with reference to FIG. 3. In operation 925, and in response to the second map request message, a second response message is received at the source network device. The second response message includes a response to the second map request message. Examples of operation 925 include the receipt of messages 460 and 660, as described above with reference to FIGS. 4 and 6, respectively, which enable a router to update a map cache independently from the security association cache. Other examples include message 360 of FIG. 3 that enables a router to update the security association cache independently from the map cache.

Finally, in operation 930, one of the stored data indicative of the mapping between the destination network device and the destination endpoint device or the stored data indicative of the security association between the source network device and the destination network device is updated independently from the other of the stored data indicative of the mapping between the destination network device and the destination endpoint device or the stored data indicative of the security association between the source network device and the destination network device.

Figure 10:
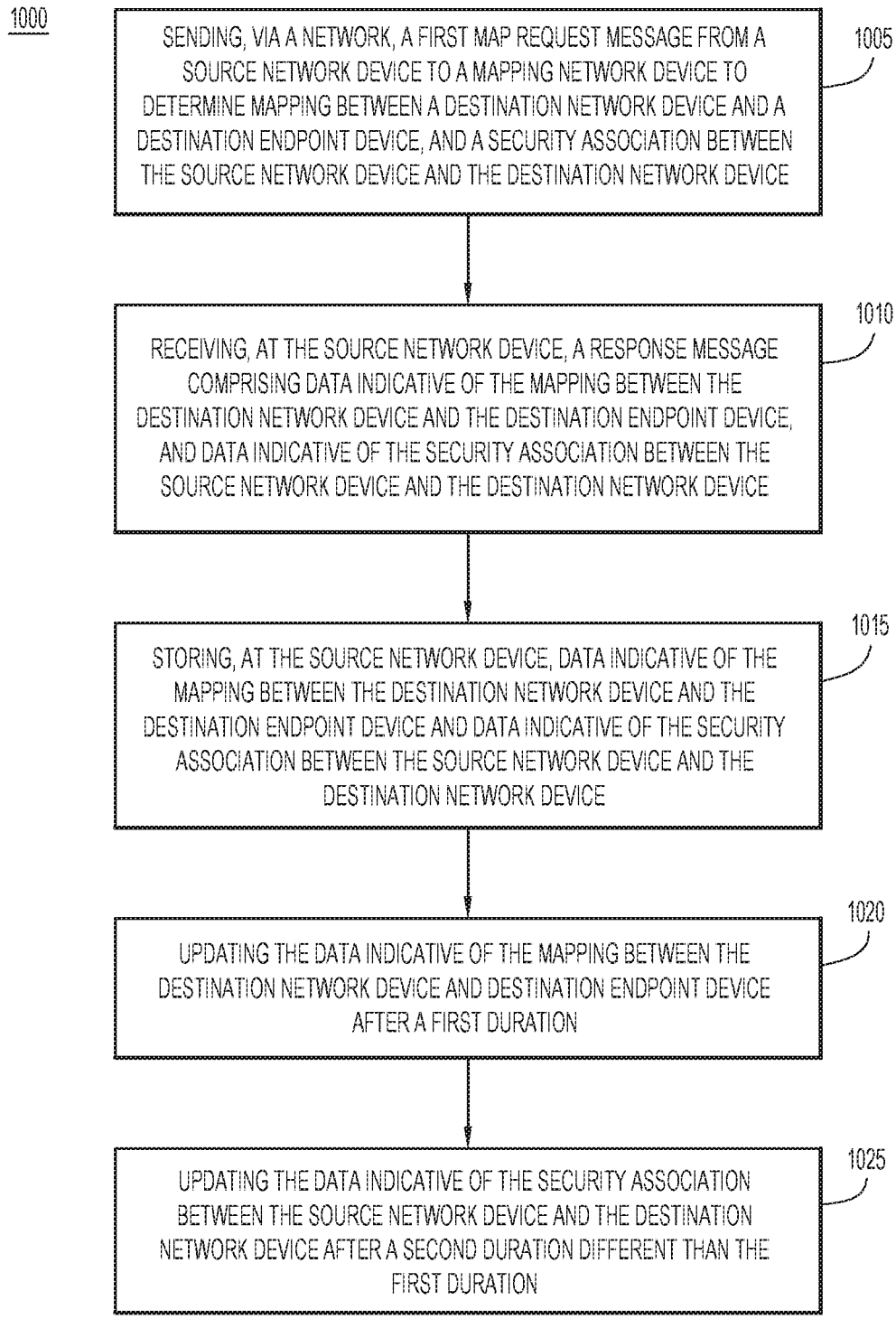
FIG. 10 is a flowchart illustrating a second process flow for implementing the location mapping and security association decoupling techniques as described herein, according to an example embodiment

With reference now made to FIG. 10, depicted therein is a flowchart 1000 illustrating a second example process for providing the location mapping and security association decoupling techniques as described herein. The process starts in operation 1005, which is similar to operation 905 of FIG. 9, in which a first map request message is sent via a network from a source network device to a mapping network device to determine a mapping between a destination network device and a destination endpoint device and a security association between the source network device and the destination network device. An example of such an operation may be the sending of one or more of message 155 in FIG. 1, message 355 in FIG. 3, message 455 in FIG. 4, message 555 in FIG. 5, message 755 in FIG. 7 and/or message 855 in FIG. 8. Additional examples include messages 870 and 890 as discussed above with reference to FIG. 8.

In operation 1010, a response message is received at the source network device. The response message includes data indicative of the mapping between the destination network device and the destination endpoint device, and data indicative of the security association between the source network device and the destination network device. As with operation 910 of FIG. 9, examples of such a message include the messages received at router 120 as discussed above with reference to FIGS. 1 and 3-8 that enable router 125 to populate its map cache and security association cache. Further examples may include messages 874 and 892 as discussed above with reference to FIG. 8.

In operation 1015, the data indicative of the mapping between the destination network device and the destination endpoint device and the data indicative of the security association between the source network device and the destination network device is stored at the source network device. Examples of operation 1015 may include the population of map caches and security association caches as described above with reference to FIGS. 1-8.

In operation 1020, the data indicative of the mapping between the destination network device and destination endpoint device is updated after a first duration. Examples of operation 1020 include the updating of map caches as described above with reference to FIGS. 4 and 6.

In operation 1025, the data indicative of the security association between the source network device and the destination network device is updated after a second duration different than the first duration. Examples of operation 1025 include the updating of security association caches as described above with reference to FIG. 6. Accordingly, because the map cache and security association cache are updated after different durations, the caches are independently updated.

Figure 11:
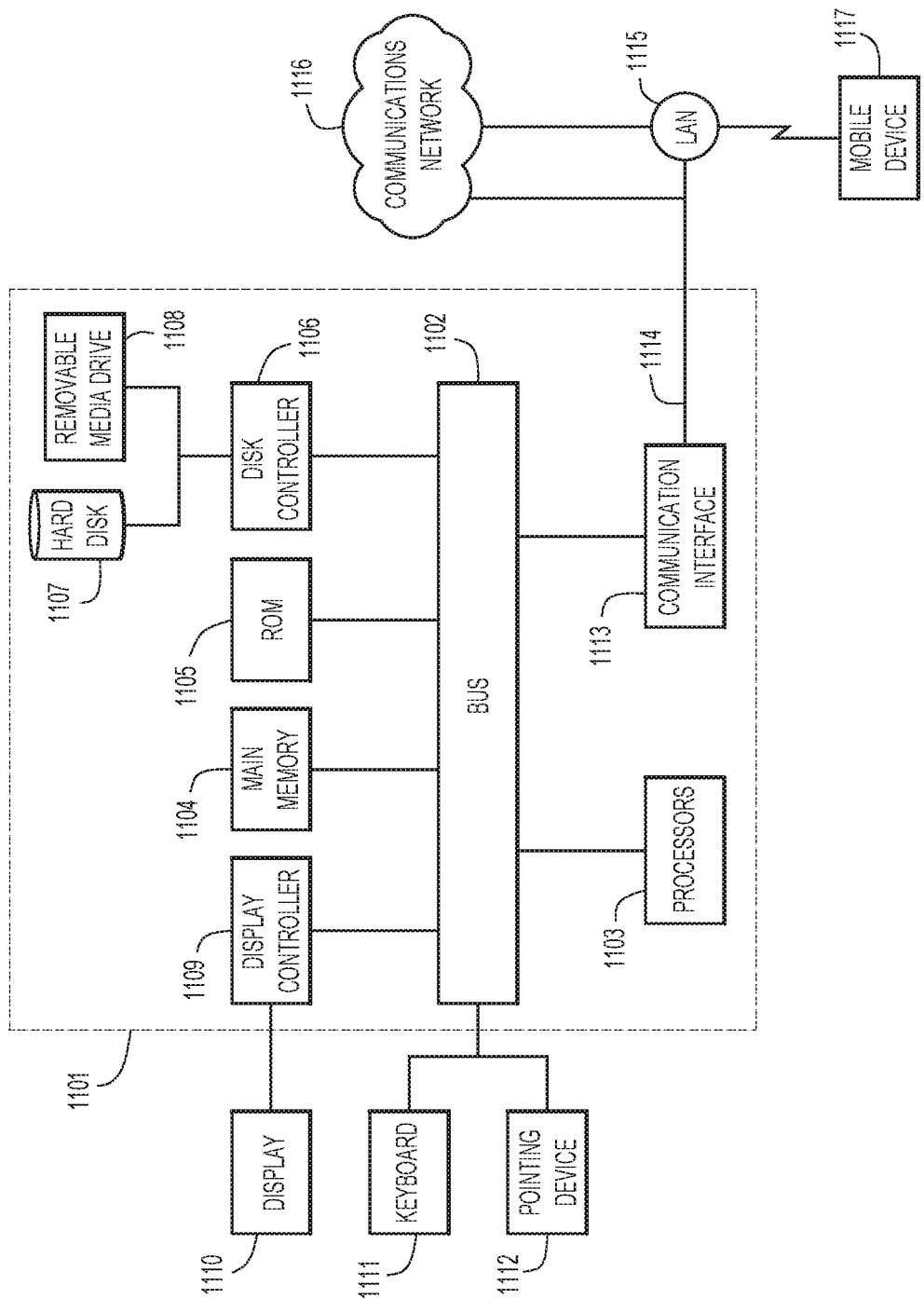
FIG. 11 is a block diagram of an apparatus configured to perform the techniques described herein, according to an example embodiment.

With reference now made to FIG. 11, depicted therein is a computer system 1101 upon which the embodiments presented may be implemented. The computer system 1101 may be programmed to implement a computer based device, such as the routers, mapping systems, and other network devices described above with reference to FIGS. 1-8. The computer system 1101 includes a bus 1102 or other communication mechanism for communicating information, and a processor 1103 coupled with the bus 1102 for processing the information. While the figure shows a single block 1103 for a processor, it should be understood that the processors 1103 represent a plurality of processing cores, each of which can perform separate processing. The computer system 1101 also includes a main memory 1104, such as a random access memory (RAM) or other dynamic storage device (e.g., dynamic RAM (DRAM), static RAM (SRAM), and synchronous DRAM (SD RAM)), coupled to the bus 1102 for storing information and instructions to be executed by processor 1103. In addition, the main memory 1104 may be used for storing temporary variables or other intermediate information during the execution of instructions by the processor 1103.

The computer system 1101 further includes a read only memory (ROM) 1105 or other static storage device (e.g., programmable ROM (PROM), erasable PROM (EPROM), and electrically erasable PROM (EEPROM)) coupled to the bus 1102 for storing static information and instructions for the processor 1103.

The computer system 1101 also includes a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive). The storage devices may be added to the computer system 1101 using an appropriate device interface (e.g., small computer system interface (SCSI), integrated device electronics (IDE), enhanced-IDE (E-IDE), direct memory access (DMA), or ultra-DMA).

The computer system 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1101 may also include a display controller 1109 coupled to the bus 1102 to control a display 1110, Liquid Crystal Display (LCD) or other now known or hereinafter developed display technologies, for displaying information to a computer user. The computer system 1101 includes input devices, such as a keyboard 1111 and a pointing device 1112, for interacting with a computer user and providing information to the processor 1103. The pointing device 1112, for example, may be a mouse, a trackball, or a pointing stick for communicating direction information and command selections to the processor 1103 and for controlling cursor movement on the display 1110. In addition, a printer may provide printed listings of data stored and/or generated by the computer system 1101.

The computer system 1101 performs a portion or all of the processing steps of the process in response to the processor 1103 executing one or more sequences of one or more instructions contained in a memory, such as the main memory 1104. Such instructions may be read into the main memory 1104 from another computer readable medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the computer system 1101 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1101, for driving a device or devices for implementing the process, and for enabling the computer system 1101 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1101 also includes a communication interface 1113 coupled to the bus 1102. The communication interface 1113 provides a two-way data communication coupling to a network link 1114 that is connected to, for example, a local area network (LAN) 1115, or to another communications network 1116 such as the Internet. For example, the communication interface 1113 may be a wired or wireless network interface card to attach to any packet switched (wired or wireless) LAN. As another example, the communication interface 1113 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices. For example, the network link 1114 may provide a connection to another computer through a local area network 1115 (e.g., a LAN) or through equipment operated by a service provider, which provides communication services through a communications network 1116. The local network 1114 and the communications network 1116 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the computer system 1101 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. The computer system 1101 can transmit and receive data, including program code, through the network(s) 1115 and 1116, the network link 1114 and the communication interface 1113. Moreover, the network link 1114 may provide a connection through a LAN 1115 to a mobile device 1117 such as a personal digital assistant (PDA) laptop computer, or cellular telephone.

In summary, provided for herein are enhancements to the LISP map-cache and resolution mechanisms that allow security associations to be calculated independently of the LISP mappings, yet still using the LISP control plane infrastructure. In the proposed method, a separate resolution flow and a separate cache are maintained in order to optimize the use of cryptographic resources in mobility scenarios where roaming events may or may not require a re-calculation of cryptographic key material. The mechanism allows pairwise unidirectional key calculation in LISP implementations. The proposed mechanism also addresses the requirements for encryption in conjunction with multicast and extraneting.

Also provided for herein is a method comprising: sending, via a network, a first map request message from a source network device to a mapping network device to determine a mapping between a destination network device and a destination endpoint device, and a security association between the source network device and the destination network device; receiving, at the source network device from the destination network device, a first response message comprising data indicative of the mapping between the destination network device and the destination endpoint device, and data indicative of the security association between the source network device and the destination network device; storing, at the source network device, stored data indicative of the mapping between the destination network device and the destination endpoint device, and stored data indicative of the security association between the source network device and the destination network device; sending a second map request message from the source network device to update the stored data indicative of the mapping between the destination network device and the destination endpoint device or the stored data indicative of the security association between the source network device and the destination network device; receiving, at the source network device, a second response message in response to the second map request message; and updating, in response to receiving the response to the second map request message, one of the stored data indicative of the mapping between the destination network device and the destination endpoint device or the stored data indicative of the security association between the source network device and the destination network device independently from another of the stored data indicative of the mapping between the destination network device and the destination endpoint device or the stored data indicative of the security association between the source network device and the destination network device.

A second method is also provided comprising: sending, via a network, a first map request message from a source network device to a mapping network device to determine a mapping between a destination network device and a destination endpoint device and a security association between the source network device and the destination network device; receiving, at the source network device, a response message comprising data indicative of the mapping between the destination network device and the destination endpoint device, and data indicative of the security association between the source network device and the destination network device; storing, at the source network device, the data indicative of the mapping between the destination network device and the destination endpoint device, and the data indicative of the security association between the source network device and the destination network device; updating the data indicative of the mapping between the destination network device and destination endpoint device after a first duration; and updating the data indicative of the security association between the source network device and the destination network device after a second duration different than the first duration.

Also provided by the present disclosure are apparatuses configured to implement operations analogous to the methods described above. For example, an apparatus is provided that includes a network interface, a memory and one or more processors. The processor is configured to: send, via the network interface, a first map request message from the apparatus to a mapping network device to determine a mapping between a destination network device and a destination endpoint device and a security association between the apparatus and the destination network device; receive, via the network interface, a response message comprising data indicative of the mapping between the destination network device and the destination endpoint device, and data indicative of the security association between the apparatus and the destination network device; store, in the memory, the data indicative of the mapping between the destination network device and the destination endpoint device, and the data indicative of the security association between the apparatus and the destination network device; update the data indicative of the mapping between the destination network device and the destination endpoint device after a first duration; and update the data indicative of the security association between the apparatus and the destination network device after a second duration different than the first duration.

A second example apparatus is provided that includes a network interface, a memory and a processor. The processor is configured to: send, via the network interface, a first map request message from the apparatus to a mapping network device to determine a mapping between a destination network device and a destination endpoint device, and a security association between the apparatus and the destination network device; receive, via the network interface from the destination network device, a first response message comprising data indicative of the mapping between the destination network device and the destination endpoint device, and data indicative of the security association between the apparatus and the destination network device; store, in the memory, stored data indicative of the mapping between the destination network device and the destination endpoint device and stored data indicative of the security association between the apparatus and the destination network device; send, via the network interface, a second map request message from the apparatus to update the stored data indicative of the mapping between the destination network device and the destination endpoint device or the stored data indicative of the security association between the apparatus and the destination network device; receive, via the network interface, a second response message in response to the second map request message; and update one of the stored data indicative of the mapping between the destination network device and the destination endpoint device or the stored data indicative of the security association between the apparatus and the destination network device independently from another of the stored data indicative of the mapping between the destination network device and the destination endpoint device or the stored data indicative of the security association between the apparatus and the destination network device.

Also provided for herein are computer readable media encoded with instructions. The instructions, when executed by a process, are configured to implement operations to carry out the techniques described herein. For example, provided for herein is a computer readable media encoded with instructions, wherein the instructions, when executed by a processor, are operable to: send, via a network, a first map request message from a source network device to a mapping network device to determine a mapping between a destination network device and a destination endpoint device, and a security association between the source network device and the destination network device; receive, at the source network device from the destination network device, a first response message comprising data indicative of the mapping between the destination network device and the destination endpoint device, and data indicative of the security association between the source network device and the destination network device; store, at the source network device, stored data indicative of the mapping between the destination network device and the destination endpoint device and stored data indicative of the security association between the source network device and the destination network device; send a second map request message from the source network device to update the stored data indicative of the mapping between the destination network device and the destination endpoint device or the stored data indicative of the security association between the source network device and the destination network device; receiving, at the source network device, a second response message in response to the second map request message; and update one of the stored data indicative of the mapping between the destination network device and the destination endpoint device or the stored data indicative of the security association between the source network device and the destination network device independently from another of the stored data indicative of the mapping between the destination network device and the destination endpoint device or the stored data indicative of the security association between the source network device and the destination network device.

As a further example, also provided for herein is a second example computer readable media encoded with instructions, wherein the instructions, when executed by a processor, are operable to send, via a network, a first map request message from a source network device to a mapping network device to determine a mapping between a destination network device and a destination endpoint device and a security association between the source network device and the destination network device; receive, at the source network device, a response message comprising data indicative of the mapping between the destination network device and the destination endpoint device, and data indicative of the security association between the source network device and the destination network device; store, at the source network device, the data indicative of the mapping between the destination network device and the destination endpoint device, and the data indicative of the security association between the source network device and the destination network device; update the data indicative of the mapping between the destination network device and destination endpoint device after a first duration; and update the data indicative of the security association between the source network device and the destination network device after a second duration different than the first duration.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

sending, via a network, a first map request message from a source network device to a mapping network device to determine a mapping between a destination network device and a destination endpoint device, and a security association between the source network device and the destination network device;

receiving, at the source network device from the destination network device, a first response message comprising data indicative of the mapping between the destination network device and the destination endpoint device, and data indicative of the security association between the source network device and the destination network device;

storing, at the source network device, stored data indicative of the mapping between the destination network device and the destination endpoint device, and stored data indicative of the security association between the source network device and the destination network device;

sending a second map request message from the source network device to update the stored data indicative of the mapping between the destination network device and the destination endpoint device or the stored data indicative of the security association between the source network device and the destination network device;

receiving, at the source network device, a second response message in response to the second map request message; and updating, in response to receiving the response to the second map request message, one of the stored data indicative of the mapping between the destination network device and the destination endpoint device or the stored data indicative of the security association between the source network device and the destination network device independently from another of the stored data indicative of the mapping between the destination network device and the destination endpoint device or the stored data indicative of the security association between the source network device and the destination network device.

2. The method of claim 1, wherein sending the second map request message comprises sending the second map request message from the source network device to the mapping network device to update the data indicative of the security association between the source network device and the destination network device; and wherein updating the one of the stored data indicative of the mapping between the destination network device and the destination endpoint device or the stored data indicative of the security association between the source network device and the destination network device comprises updating the stored data indicative of the security association between the source network device and the destination network device independently from the stored data indicative of the mapping between the destination network device and the destination endpoint device.

3. The method of claim 2, wherein receiving the second response message in response to the second map request message comprises receiving data indicative of a security association between the destination network device and a second destination network device.

4. The method of claim 1, wherein sending the second map request message comprises sending the second map request message from the source network device to the mapping network device to update the data indicative of the mapping between the destination network device and the destination endpoint device; and wherein updating the one of the stored data indicative of the mapping between the destination network device and the destination endpoint device or the stored data indicative of the security association between the source network device and the destination network device comprises updating the data indicative of the mapping between the destination network device and the destination endpoint device independently from the stored data indicative of the security association between the source network device and the destination network device.

5. The method of claim 4, wherein receiving the second response message in response to the second map request message comprises receiving data indicative of a security association between the destination endpoint device and the destination network device.

6. The method of claim 1, wherein the data indicative of the security association between the source network device and the destination network device comprises an encryption key.

7. The method of claim 1, wherein receiving the first response message comprises receiving, from the mapping network device, an encryption key for encrypting traffic sent to a multicast group.

8. The method of claim 1, wherein receiving the first response message comprises receiving the first response message from the destination network device.

9. The method of claim 1, wherein storing the data indicative of the mapping between the destination network device and the destination endpoint device, and the data indicative of the security association between the source network device and the destination network device comprises:

storing the data indicative of the mapping between the destination network device and the destination endpoint device in a first cache; and storing the data indicative of the security association between the source network device and the destination network device in a second cache.

10. A method comprising:

sending, via a network, a first map request message from a source network device to a mapping network device to determine a mapping between a destination network device and a destination endpoint device and a security association between the source network device and the destination network device;

receiving, at the source network device, a response message comprising data indicative of the mapping between the destination network device and the destination endpoint device, and data indicative of the security association between the source network device and the destination network device;

storing, at the source network device, the data indicative of the mapping between the destination network device and the destination endpoint device, and the data indicative of the security association between the source network device and the destination network device;

updating the data indicative of the mapping between the destination network device and the destination endpoint device after a first duration; and updating the data indicative of the security association between the source network device and the destination network device after a second duration different than the first duration.

11. The method of claim 10, wherein receiving the response message comprises receiving the response message from the destination network device.

12. The method of claim 10, wherein updating the data indicative of the mapping between the destination network device and destination endpoint device after the first duration comprises:

sending a second map request message from the source network device to the mapping network device; and receiving a second response message from the mapping network device.

13. The method of claim 12, wherein the second response message comprises data indicative of a second destination network device.

14. The method of claim 10, wherein updating the data indicative of the security association between the source network device and the destination network device after the second duration comprises:

sending a second map request message from the source network device to the mapping network device; and receiving a second response message from a network device through which the destination endpoint device accesses the network.

15. The method of claim 10, wherein receiving the data indicative of the security association between the source network device and the destination network device comprises receiving an encryption key for encrypting traffic sent to a multicast group.

16. An apparatus comprising:

a memory;

a network interface configured to transmit and receive data over a network, and a processor coupled to the network interface, wherein the processor is configured to:

send, via the network interface, a first map request message from the apparatus to a mapping network device to determine a mapping between a destination network device and a destination endpoint device and a security association between the apparatus and the destination network device;

receive, via the network interface, a response message comprising data indicative of the mapping between the destination network device and the destination endpoint device, and data indicative of the security association between the apparatus and the destination network device;

store, in the memory, the data indicative of the mapping between the destination network device and the destination endpoint device, and the data indicative of the security association between the apparatus and the destination network device;

update the data indicative of the mapping between the destination network device and the destination endpoint device after a first duration; and update the data indicative of the security association between the apparatus and the destination network device after a second duration different than the first duration.

17. The apparatus of claim 16, wherein the processor is configured to receive the response message by receiving the response message from the destination network device.

18. The apparatus of claim 16, wherein the processor is configured to update the data indicative of the mapping between the destination network device and destination endpoint device after the first duration by:
   sending, via the network interface, a second map request message from the apparatus to the mapping network device; and
   receiving, via the network interface, a response message from the mapping network device.

19. The apparatus of claim 16, wherein the processor is configured to update the data indicative of the security association between the apparatus and the destination network device after the second duration by:
   sending a second map request message from the apparatus to the mapping network device; and
   receiving a response message from a network device through which the destination endpoint device accesses the network.

20. The apparatus of claim 16, wherein the processor is configured to receive the data indicative of the security association between the apparatus and the destination network device by receiving an encryption key for encrypting traffic sent to a multicast group.

* * * * *